United States Patent
Miyazaki (10) Patent No.: US 7,526,017 B2
(45) Date of Patent: Apr. 28, 2009

(54) TRANSMITTING DEVICE, RECEIVING DEVICE, TRANSMISSION SYSTEM, AND TRANSMISSION METHOD

(75) Inventor: Hiroyuki Miyazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 101 days.

(21) Appl. No.: 11/708,000

(22) Filed: Feb. 20, 2007

(65) Prior Publication Data
US 2008/0069192 A1    Mar. 20, 2008

(51) Int. Cl.
  H03K 11/00  (2006.01)
  H04L 25/60  (2006.01)
  H04L 25/64  (2006.01)

(52) U.S. Cl. .................. 375/214; 375/354; 375/372; 710/3; 710/4; 326/93

(58) Field of Classification Search ............. 375/214, 375/354, 360, 361, 372; 710/3, 4; 326/93
See application file for complete search history.

(56) References Cited

U.S. PATENT DOCUMENTS

| 5,761,735 | A | 6/1998 | Huon et al. | |
| 6,266,710 | B1 * | 7/2001 | Dittmer et al. | 710/1 |
| 6,452,421 | B2 * | 9/2002 | Saito | 326/93 |
| 6,813,724 | B2 * | 11/2004 | Saito | 713/401 |
| 7,187,737 | B2 * | 3/2007 | Iseki | 375/354 |
| 2002/0180484 | A1 | 12/2002 | Kitagawa | |

FOREIGN PATENT DOCUMENTS

| JP | 3-206543 | 9/1991 |
| JP | 2001-195354 | 7/2001 |
| JP | 2002-108809 | 4/2002 |
| JP | 2002-368727 | 12/2002 |
| JP | 2004-038457 | 2/2004 |

OTHER PUBLICATIONS

International Search Report dated Sep. 27, 2004.

* cited by examiner

*Primary Examiner*—Ted Wang
(74) *Attorney, Agent, or Firm*—Staas & Halsey LLP (57) ABSTRACT

A transmitter LSI 1 transmits a source clock, transmission data, and a transmission sync signal indicating the timing of the transmission data to a receiver LSI for establishing transmission synchronization between LSIs. The transmitter LSI 1 includes: a data transmission section that transmits, as the source clock, a transmitter LSI system clock input from outside to the receiver LSI and, at the same time, transmits the transmission data according to the transmitter LSI system clock to the receiver LSI; and one or more transmission sync signal generation sections 11 that generate the transmission sync signal based on the timing of the transmitter LSI system clock and an inter-LSI sync signal input from outside.

10 Claims, 7 Drawing Sheets

RELATED ART

TRANSMITTING DEVICE, RECEIVING DEVICE, TRANSMISSION SYSTEM, AND TRANSMISSION METHOD

TECHNICAL FIELD

The present invention relates to a transmitting device, a receiving device, a transmission system, and a transmission method and, more particularly, to those for performing data transmission while establishing synchronization between a plurality of LSIs (Large Scale Integrated circuit).

BACKGROUND ART

Figure 9:
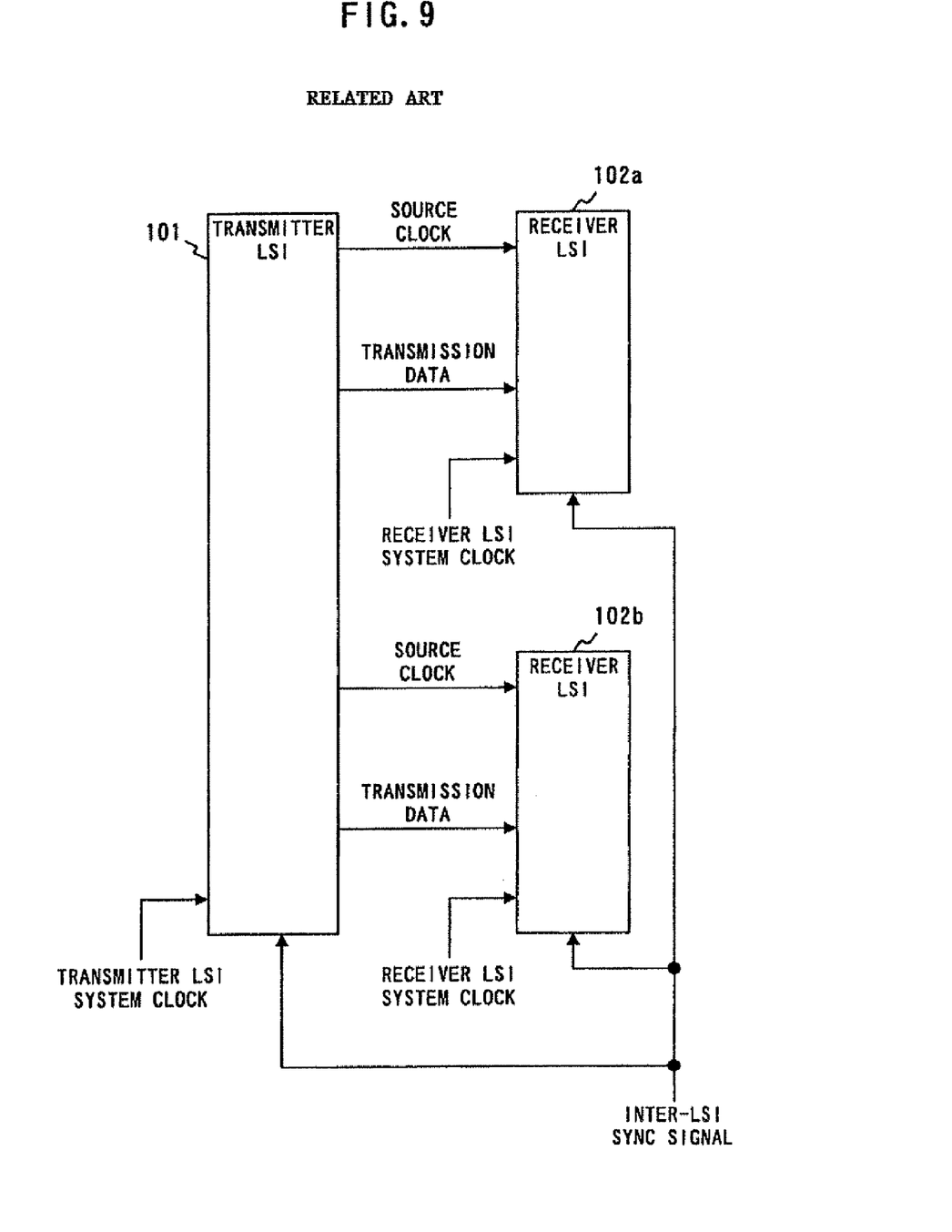
FIG. 9 is a block diagram showing an example of a configuration of a conventional inter-LSI transmission system.

In a conventional data transmission between LSIs, source synchronous transmission scheme has been used to achieve high-speed and high-response data transmission. FIG. 9 is a block diagram showing an example of a configuration of a conventional inter-LSI transmission system. The inter-LSI transmission system of FIG. 9 includes one transmitter LSI 101 and two receiver LSIs 102a and 102b. The receiver LSIs 102a and 102b have the same configuration. Transmission paths between the transmitter LSI 101 and receiver LSIs 102a, 102b including a clock transmission path for transmitting a source clock and a data transmission path for transmitting transmission data are bundled into one for transmission over the same path length.

A transmitter LSI system clock is input to the transmitter LSI 101 from outside. A receiver LSI system clock is input to the receiver LSIs 102a and 102b from outside. Further, an inter-LSI sync signal is input respectively to the transmitter LSI 101 and two receiver LSIs 102a and 102b from outside.

It is to be noted, in such an inter-LSI transmission system, that the transmission delay time changes depending on the length of an inter-LSI transmission path. In the case where data transmission from the LSI 101 to LSI 102a and data transmission from LSI 101 to LSI 102b are performed, it is difficult to synchronize the timing at which the data can be referred to on the LSI 102a and LSI 102b. To that end, it has been necessary to deliver a kind of a definer signal serving as a reference signal to both the LSIs 102a and 102b from outside.

As a prior art relating to the present invention, Patent Document 1 described below is known.

Patent Document 1: Jpn. Pat. Appln. Laid-Open Publication No. 2001-195354 (Pages 3 to 5, FIG. 1)

In the technique disclosed in Patent Document 1, synchronization is established at the initial clock of the source clock signal from the transmitter LSI 101 in order to determine the timing at which the data can be referred to on the LSI 102a and LSI 102b. The initial waveform in high frequency data transmission is generally bad in quality, so that performing synchronization using only the initial clock may decrease reliability.

Further, in order to establish resynchronization after initialization of only the receiver LSI, it has been necessary to define/design the definer signals corresponding to the number of types of interfaces and to provide independent resets for each interface.

DISCLOSURE OF INVENTION

The present invention has been made to solve the above problem, and an object thereof is to provide a transmitting device, a receiving device, a transmission system, and a transmission method capable of performing inter-LSI communication at high-speed and with high reliability.

To solve the above problem, according to a first aspect of the present invention, there is provided a transmitting device that transmits a source clock, transmission data, and a transmission sync signal indicating the timing of the transmission data to a receiving device, comprising: a data transmission section that transmits, as the source clock, a transmitting device system clock input from outside to the receiving device and, at the same time, transmits the transmission data according to the transmitting device system clock to the receiving device; and one or more transmission sync signal generation sections that generate the transmission sync signal based on the timing of the transmitting device system clock and an inter-device sync signal input from outside.

According to a second aspect of the present invention, there is provided a receiving device that receives a source clock, transmission data, and a transmission sync signal indicating the timing of the transmission data which are transmitted from a transmitting device, comprising: a write address generation section that generates a write address based on the timing of the source clock and transmission sync signal; a read address generation section that generates a read address based on the timing of a receiving device system clock and an inter-device sync signal which are input from outside; and a data buffer that stores the transmission data according to the write address and reads out the transmission data according to the read address.

In the receiving device according to the present invention, the frequency of the receiving device system clock is 1/m (1 and m are integer numbers) times the frequency of the transmitting device system clock, the read address generation section generates a read timing and a read address for reading data at a rate of m bits per l cycles of the receiving device system clock; and the data buffer reads out the store data according to the read timing and read address at a rate of m bits per l cycles of the receiving device system clock.

In the receiving device according to the present invention, the reception timing of inter-device sync signal is synchronized between a plurality of the receiving devices.

According to a third aspect of the present invention, there is provided a transmission system comprising: a transmitting device that transmits a source clock, transmission data, and a transmission sync signal indicating the timing of the transmission data, and one or more receiving devices that receive the source clock, transmission data, and transmission sync signal. The transmitting device comprises: a data transmission section that transmits, as the source clock, a transmitting device system clock input from outside to the receiving device and, at the same time, transmits the transmission data according to the transmitting device system clock to the receiving device; and one or more transmission sync signal generation sections that generate the transmission sync signal based on the timing of the transmitting device system clock and an inter-device sync signal input from outside. The receiving device comprises: a write address generation section that generates a write address based on the timing of the source clock and transmission sync signal; a read address generation section that generates a read address based on the timing of a receiving device system clock and an inter-device sync signal which are input from outside; and a data buffer that stores the transmission data according to the write address and reads out the transmission data according to the read address.

In the transmission system according to the present invention, the frequency of the receiving device system clock is 1/m (1 and m are integer numbers) times the frequency of the transmitting device system clock, the read address generation section generates a read timing and a read address for reading data at a rate of m bits per I cycles of the receiving device system clock; and the data buffer reads out the store data according to the read timing and read address at a rate of m bits per I cycles of the receiving device system clock.

In the transmission system according to the present invention, the reception timing of inter-device sync signal is synchronized between a plurality of the receiving devices.

According to a fourth aspect of the present invention, there is provided a transmission method that transmits a source clock, transmission data, and a transmission sync signal indicating the timing of the transmission data from a transmitting device to a receiving device, comprising: a data transmission step that transmits, as the source clock, a transmitting device system clock input from outside to the receiving device and, at the same time, transmits the transmission data according to the transmitting device system clock to the receiving device in the transmitting device; and one or more transmission sync signal generation steps that generate the transmission sync signal based on the transmitting device system clock and an inter-device sync signal input from outside in the transmitting device; a write address generation step that generates a write address based on the timing of the source clock and transmission sync signal in the receiving device; a read address generation step that generates a read address based on the timing of a receiving device system clock and an inter-device sync signal which are input from outside in the receiving device; and a data storage step that stores the transmission data input from the transmitting device according to the write address and reads out the transmission data according to the read address in the receiving device.

In the transmission method according to present invention, the frequency of the receiving device system clock is l/m (l and m are integer numbers) times the frequency of the transmitting device system clock, the read address generation step generates a read timing and a read address for reading data at a rate of m bits per I cycles of the receiving device system clock; and the data storage step reads out the store data according to the read timing and read address at a rate of m bits per I cycles of the receiving device system clock.

In the transmission method according to present invention, the reception timing of inter-device sync signal is synchronized between a plurality of the receiving devices.

The transmitting device corresponds to a transmitter LSI in the embodiment described below. The receiving device corresponds to a receiver LSI in the embodiment. The inter-device sync signal corresponds to an inter-LSI sync signal in the embodiment. The transmitting device system clock corresponds to a transmitter LSI system clock in the embodiment. The receiving device system clock corresponds to a receiver LSI system clock in the embodiment. The data transmission section corresponds to a part (latch 13) that outputs transmission data and a part that outputs the source clock from the transmitter LSI system clock in the embodiment.

BEST MODE FOR CARRYING OUT THE INVENTION

An embodiment of the present invention will be described below with reference to the accompanying drawings.

Figure 1:
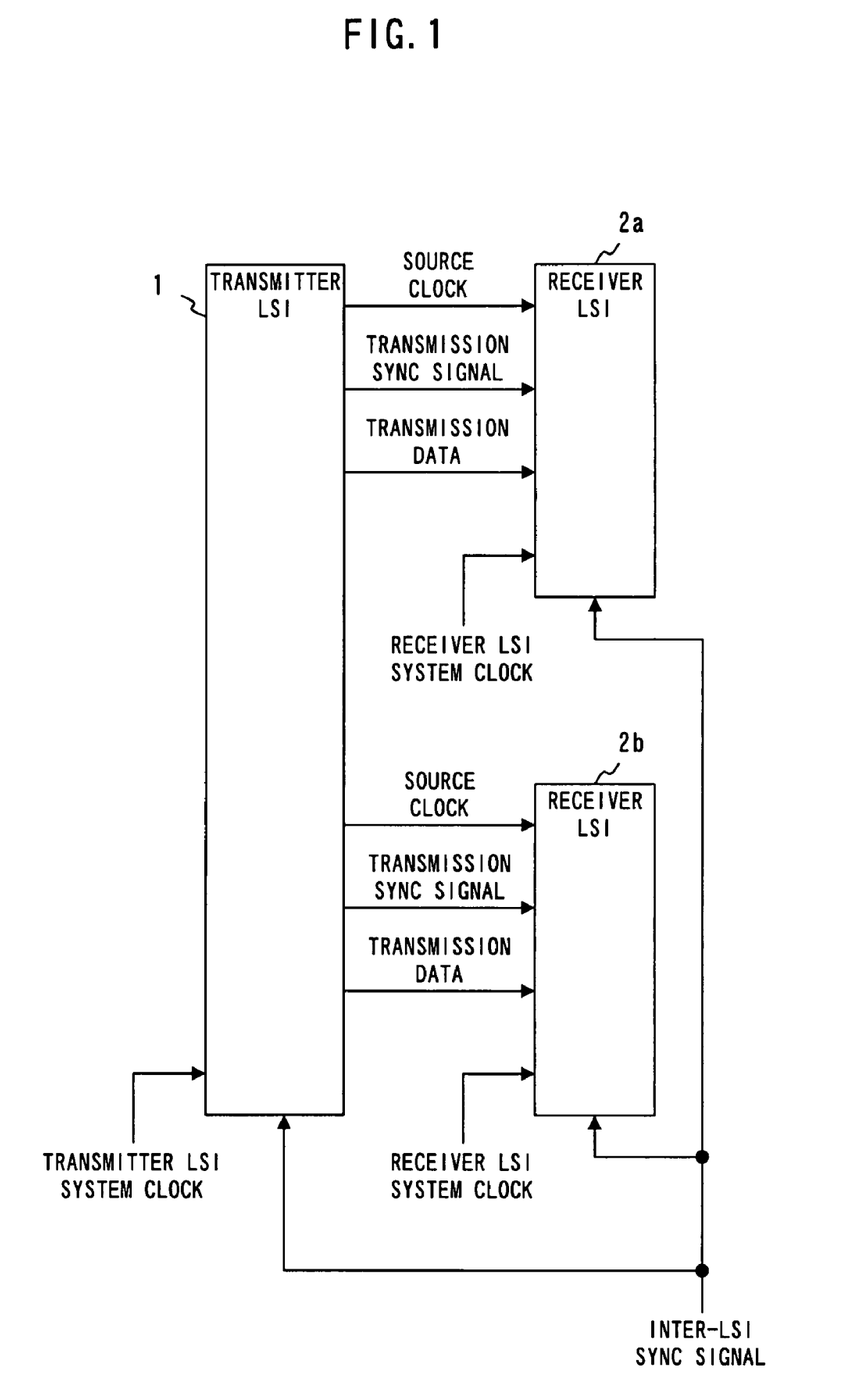
FIG. 1 is a block diagram showing an example of an inter-LSI transmission system according to the present invention.

FIG. 1 is a block diagram showing an example of an inter-LSI transmission system according to the present invention. The inter-LSI transmission system of FIG. 1 includes one transmitter LSI 1 and two receiver LSIs 2a and 2b. The receiver LSIs 2a and 2b have the same configuration. Transmission paths between the transmitter LSI 1 and receiver LSIs 2a, 2b, including a clock transmission path for transmitting a source clock, a transmission sync signal path for transmitting a transmission sync signal, and a data transmission path for transmitting transmission data are bundled into one for transmission over the same path length.

A transmitter LSI system clock is input to the transmitter LSI 1 from outside. A receiver LSI system clock is input respectively to the receiver LSIs 2a and 2b from outside. Further, an inter-LSI sync signal is input respectively to the transmitter LSI 1 and two receiver LSIs 2a and 2b from outside. The reception timings of the receiver LSI system clock and inter-LSI sync signal are synchronized between the receiver LSIs 2a and 2b.

Figure 2:
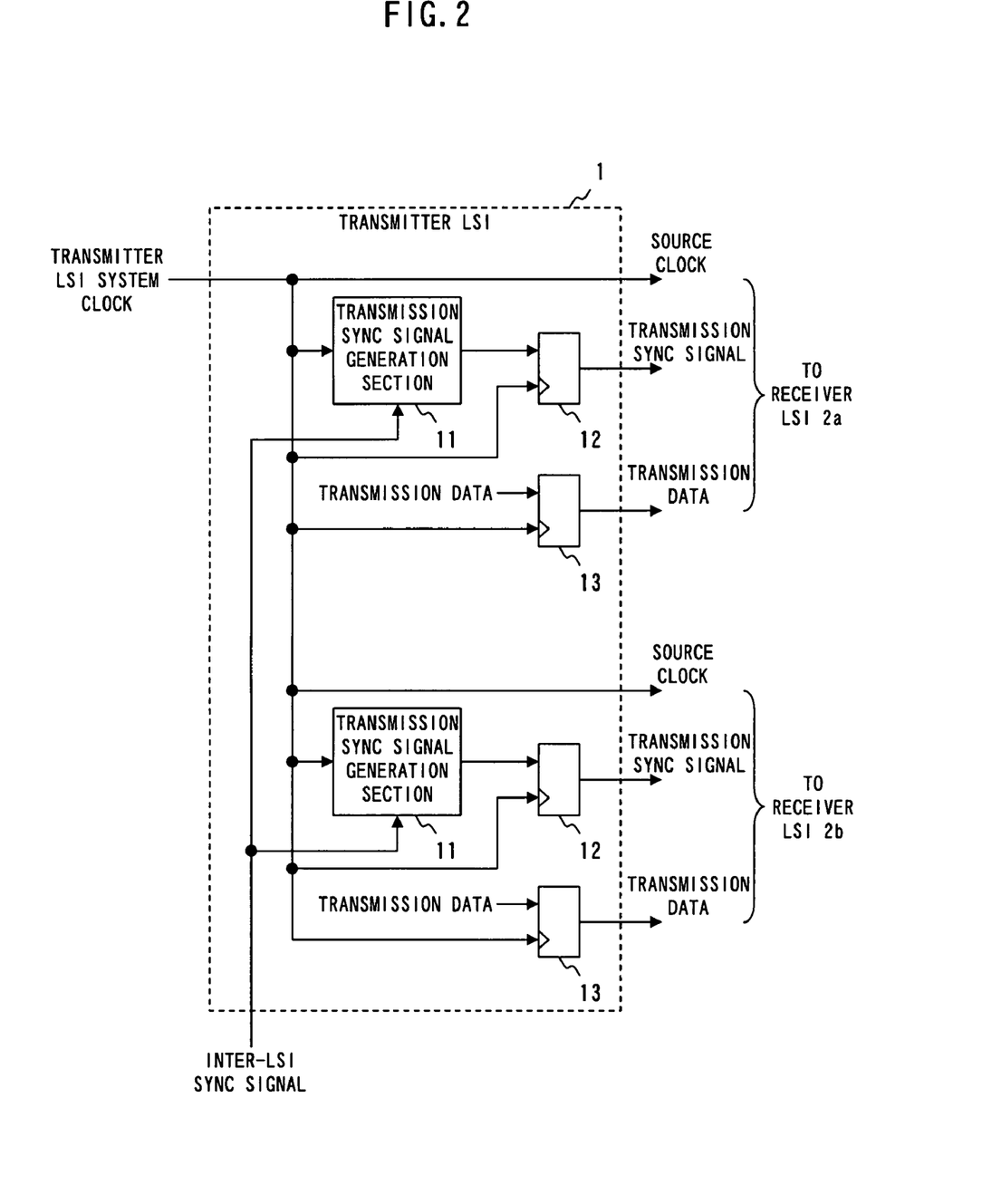
FIG. 2 is a block diagram showing an example of a configuration of a transmitter LSI according to the present invention.

FIG. 2 is a block diagram showing an example of a configuration of the transmitter LSI according to the present invention. The transmitter LSI 1 includes a transmission sync signal generation section 11 and latches 12, 13. The transmission sync signal generation section 11 and latches 12, 13 operate at the transmitter LSI system clock input from outside.

Figure 3:
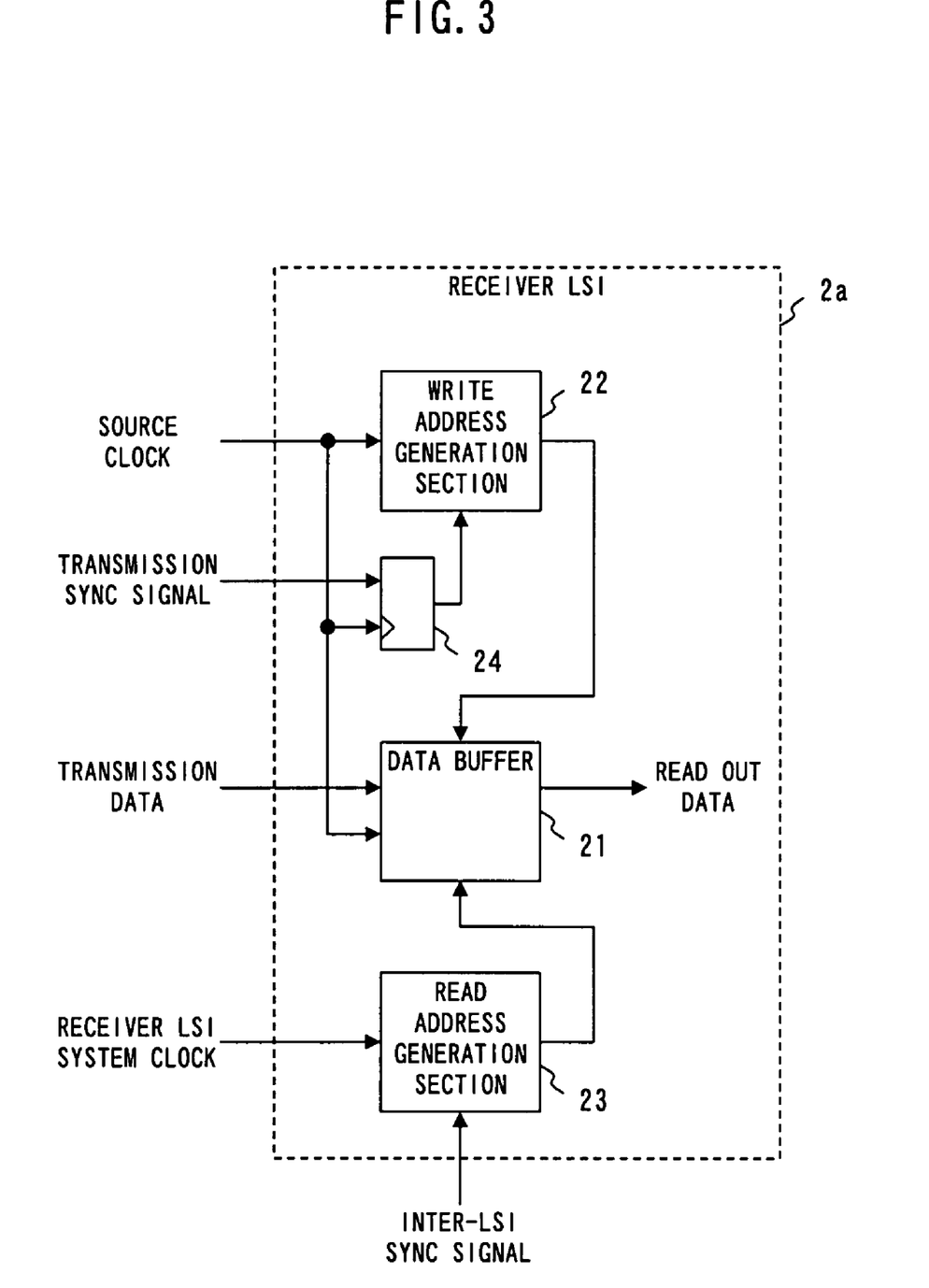
FIG. 3 is a block diagram showing an example of a configuration of a receiver LSI according to the present invention.

FIG. 3 is a block diagram showing an example of a configuration of the receiver LSI according to the present invention. The receiver LSI 2a includes a data buffer 21, a write address generation section 22, a read address generation section 23, a latch 24. The data buffer 21, write address generation section 22, and latch 24 operate at the source clock input from the transmitter LSI 1. The read address generation section 23 operates at the receiver LSI system clock input from outside.

Figure 4:
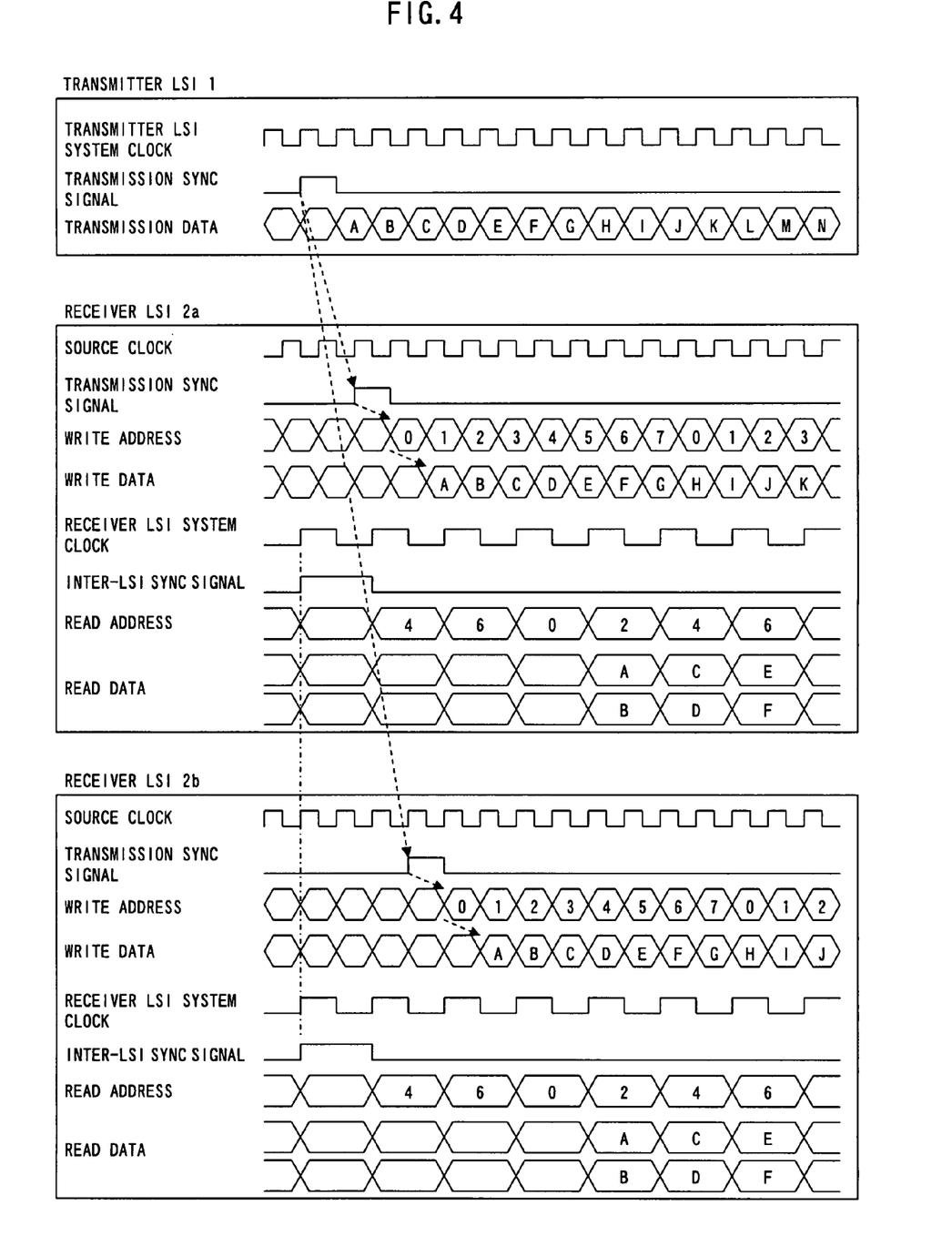
FIG. 4 is a time chart showing an example of the operation of the inter-LSI transmission system according to the present invention.

FIG. 4 is a time chart showing an example of the operation of the inter-LSI transmission system according to the present invention. Specifically, FIG. 4 shows waveforms of the transmitter LSI system clock, transmission sync signal, and transmission data which are observed on the transmitter LSI, and waveforms of the source clock, transmission sync signal, write address, write data, receiver LSI system clock, inter-LSI sync signal, read address, and read data which are observed on the receiver LSIs 2a and 2b. The frequency ratio between the transmitter LSI system clock for driving the transmitter LSI and receiver LSI system clock for driving the receiver LSI is set to an integer ratio. In the present embodiment, transmitter LSI system clock frequency: receiver LSI system clock frequency=m:l (l and m are integer numbers) is set to 2:1.

Figure 5:
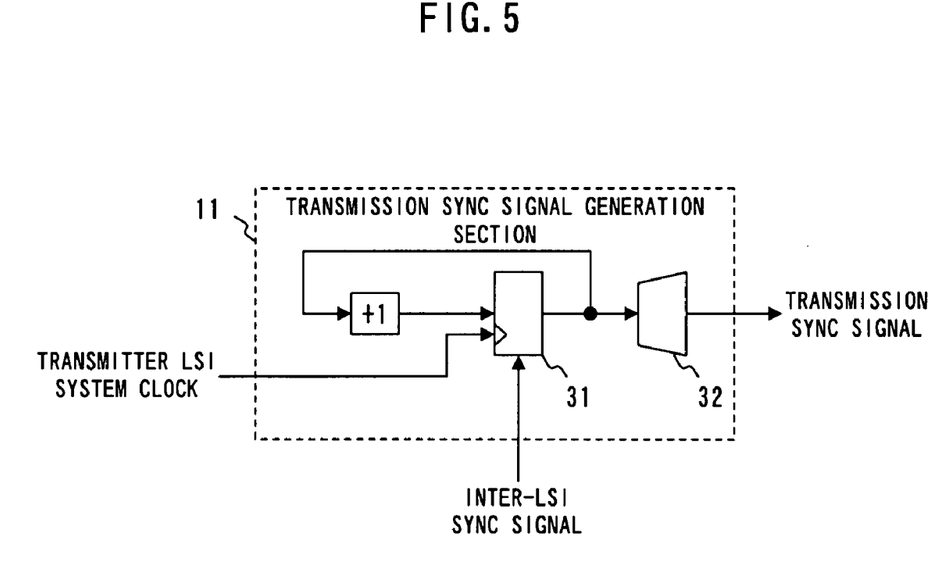
FIG. 5 is a block diagram showing an example of a configuration of a transmission sync signal generation section according to the present invention.

On the transmitter LSI 1 side, the transmission sync signal generation section 11 generates a transmission sync signal with a period that is an integral multiple of that of the transmitter LSI system clock and outputs the generated transmission sync signal to the receiver LSI 2a or 2b through the latch 12. FIG. 5 is a block diagram showing an example of a configuration of the transmission sync signal generation section according to the present invention. The transmission sync signal generation section 11 includes a counter 31 and decoder 32. The counter 31 is reset by the inter-LSI sync signal and performs counting according to the transmitter LSI system clock. When the output of the counter 31 has reached a predetermined value, that is, when a predetermined time has elapsed, the decoder 32 outputs a pulse. The transmitter LSI 1 simultaneously sends the source clock, transmission sync signal, and transmission data.

Figure 6:
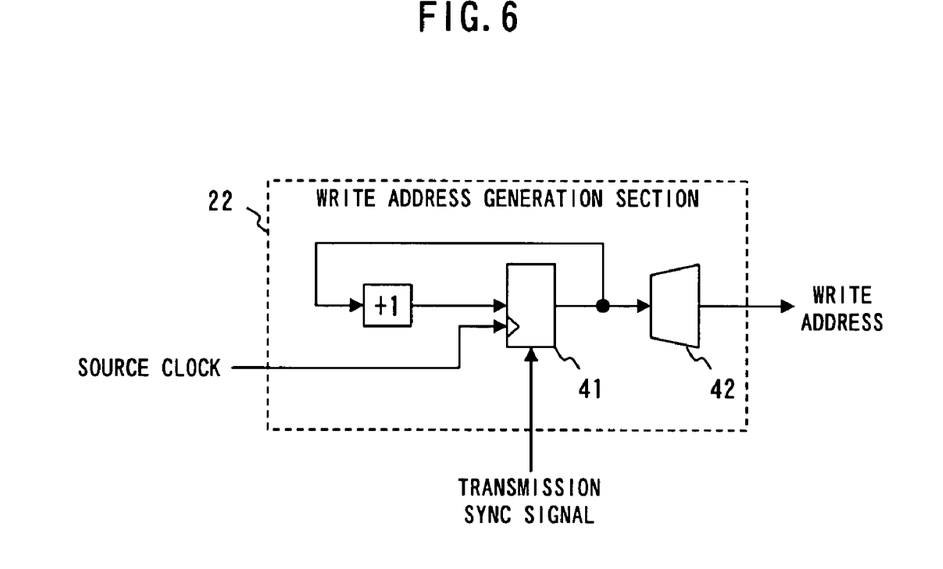
FIG. 6 is a block diagram showing an example of a configuration of a write address generation section according to the present invention.

On the receiver LSIs 2a and 2b side, the latch 24 uses the input source clock to sample the transmission sync signal. The write address generation section 22 uses the transmission sync signal to reset the write address and outputs a generated write address to the data buffer 21. FIG. 6 is a block diagram showing an example of a configuration of the write address generation section according to the present invention. The write address generation section 22 includes a counter 41 and decoder 42. The counter 41 is reset by the inter-LSI sync signal and performs counting according to the source clock. The decoder 42 outputs the output of the counter 41 as a write address.

Figure 7:
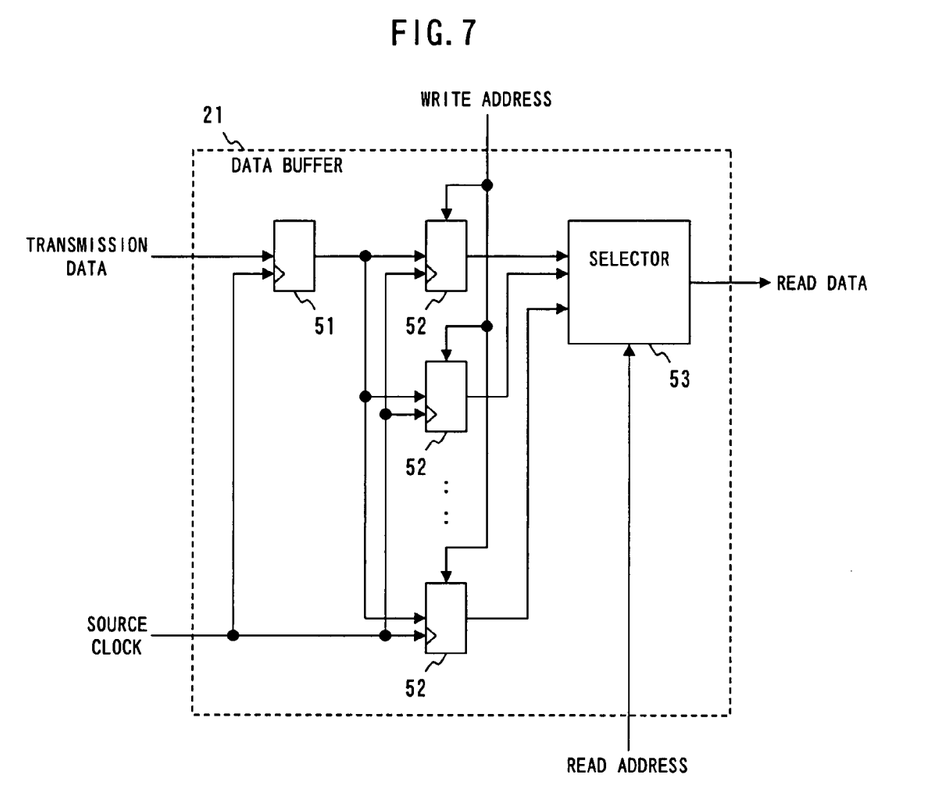
FIG. 7 is a block diagram showing an example of a configuration of a data buffer according to the present invention.

The data buffer 21 uses the source clock to sample the transmission data and stores the transmission data as write data according to the value of the write address. FIG. 7 is a circuit diagram showing an example of a configuration of the data buffer according to the present invention. The data buffer 21 includes a latch 51, n (n is integer number) buffers 52, and a selector 53. In writing operation, the transmission data is latched by the latch 51 and sequentially stored in the buffer 52 according to the value of the write address.

As concretely shown in FIG. 4, although reception timings of the transmission sync signal differ between the receiver LSIs 2a and 2b due to signal propagation delay on the transmission path, the receiver LSIs 2a and 2b reset the write address (write address=0) according to the transmission sync signal and store the transmission data as write data (write data=A) according to the write address.

Figure 8:
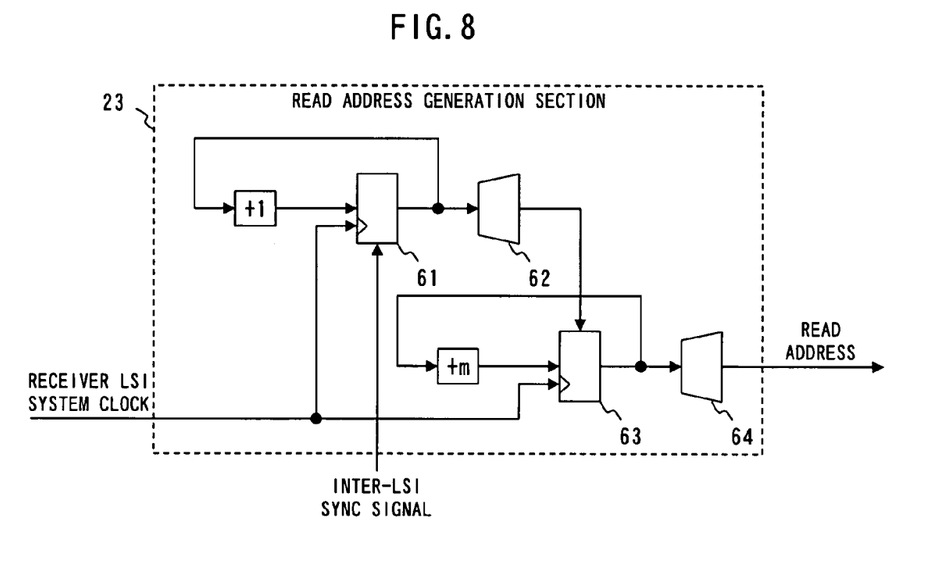
FIG. 8 is a block diagram showing an example of a configuration of a read address generation section according to the present invention.

After that, the read address generation section 23 uses the inter-LSI sync signal to reset the read address and outputs a generated read address and read timing to the data buffer 21. The data buffer 21 outputs the data to outside according to the read address and read timing. FIG. 8 is a block diagram showing an example of a configuration of the read address generation section according to the present invention. The read address generation section 23 includes a counter 61, a decoder 62, a counter 63, and a decoder 64. The counter 61 is reset by the inter-LSI sync signal and performs counting according to the receiver LSI system clock. The decoder 62 resets the counter 61 when the output of the counter 61 becomes a value synchronized with the cycle of the inter-LSI sync signal. The counter 63 increments its count at a rate of m per one cycle of the receiver LSI system clock. The decoder 64 outputs the output of the counter 63 as a read address.

In reading operation, the selector 53 of the data buffer 21 of FIG. 7 sequentially selects the buffer 52 from outputs (n bits) of the n buffers 52 according to the read address at a rate of m bits per l cycles of the receiver LSI system clock and without exceeding its rate, and outputs the output of the buffer 52 as read data.

As concretely shown in FIG. 4, the receiver LSIs 2a and 2b reset the read address (read address=4) to a predetermined value (read address=4) according to the receiver LSI system clock and inter-LSI sync signal reception timing of each of which is synchronized between the receiver LSIs 2a and 2b and, after that, output read data (read data=A) from the initial value (read address=0) of the read address.

As described above, all receiver LSIs write data according to the transmission sync signal sent from the transmitter LSI and read data according to the inter-LSI sync signal whose timing has been adjusted. Thus, even if the inter-LSI transmission delay time differs in the case where data is transmitted from one transmitter LSI to a plurality of receiver LSIs, the data that has been written can certainly be referred to, thereby achieving accurate data transmission.

Further, in the case where only the receiver LSI is initialized, by receiving the transmission sync signal, it is possible to easily establish resynchronization and reconnection even after the initialization of the receiver LSI.

Further, in the case where only the transmitter LSI is initialized, by performing control such that the timing at which the transmitter LSI system clock for use in generation of the transmission sync signal is input to the transmitter LSI is not changed, it is possible to perform data transmission at the same timing as before the initialization of the transmitter LSI, thereby achieving reconnection after the initialization of the transmitter LSI.

Although two receiver LSIs are used in the present embodiment, it should be understood that any number of receiver LSIs can be used.

INDUSTRIAL APPLICABILITY

As described above, the abovementioned inter-LSI transmission system provides a mechanism for timing synchronization between LSIs in data transmission process and a mechanism for timing resynchronization after initialization of only the transmitter LSI or receiver LSI. With the above mechanisms, it is possible to realize improved timing synchronization between a plurality of LSIs, enabling construction of a system that performs complicated processing such as dynamic connection or disconnection of LSIs.

The invention claimed is:

1. A transmitting device that transmits a source clock, transmission data, and a plurality of transmission sync signals indicating the timing of the transmission data to a plurality of receiving devices, the transmitting device comprising:
    a data transmission section that is provided for each of the receiving devices, transmits, as the source clock, a transmitting device system clock input from outside to a corresponding receiving device and, at the same time, transmits the transmission data according to the transmitting device system clock to the corresponding receiving device; and
    a transmission sync signal generation section that is provided for each of the receiving devices, generates a transmission sync signal based on the timing of a corresponding transmitting device system clock and an inter-device sync signal input from outside,
    wherein the transmission sync signal resets a write address in the corresponding receiving device in which the transmission data received thereby is stored, and the inter-device sync signal resets a read address in the corresponding receiving device from which the transmission data stored therein is read.

2. A receiving device that receives a source clock, transmission data, and a transmission sync signal indicating the timing of the transmission data which are transmitted from a transmitting device, comprising:
   a write address generation section that generates a write address based on the timing of the source clock and transmission sync signal;
   a read address generation section that generates a read address based on the timing of a receiving device system clock and an inter-device sync signal which are input from outside; and
   a data buffer that stores the transmission data according to the write address and reads out the transmission data according to the read address.

3. The receiving device according to claim 2, wherein
   the frequency of the receiving device system clock is l/m (l and m are integer numbers) times the frequency of the source clock;
   the read address generation section generates a read timing and a read address for reading data at a rate of m bits per l cycles of the receiving device system clock; and
   the data buffer reads out the store data according to the read timing and read address at a rate of m bits per l cycles of the receiving device system clock.

4. The receiving device according to claim 2, wherein
   the reception timing of inter-device sync signal is synchronized between a plurality of the receiving devices.

5. A transmission system comprising:
   a transmitting device that transmits a source clock, transmission data, and a transmission sync signal indicating the timing of the transmission data, and
   one or more receiving devices that receive the source clock, transmission data, and transmission sync signal,
   the transmitting device comprising:
   a data transmission section that transmits, as the source clock, a transmitting device system clock input from outside to the receiving device and, at the same time, transmits the transmission data according to the transmitting device system clock to the receiving device; and
   the one or more transmission sync signal generation sections that generate the transmission sync signal based on the timing of the transmitting device system clock and an inter-device sync signal input from outside,
   the receiving device comprising:
   a write address generation section that generates a write address based on the timing of the source clock and transmission sync signal;
   a read address generation section that generates a read address based on the timing of a receiving device system clock and an inter-device sync signal which are input from outside; and
   a data buffer that stores the transmission data according to the write address and reads out the transmission data according to the read address.

6. The transmission system according to claim 5, wherein
   the frequency of the receiving device system clock is l/m (l and m are integer numbers) times the frequency of the transmitting device system clock,
   the read address generation section generates a read timing and a read address for reading data at a rate of m bits per l cycles of the receiving device system clock; and
   the data buffer reads out the store data according to the read timing and read address at a rate of m bits per l cycles of the receiving device system clock.

7. The transmission system according to claim 5, wherein
   the reception timing of inter-device sync signal is synchronized between a plurality of the receiving devices.

8. A transmission method that transmits a source clock, transmission data, and a transmission sync signal indicating the timing of the transmission data from a transmitting device to a receiving device, the method comprising:
   a data transmission step that transmits, as the source clock, a transmitting device system clock input from outside to the receiving device and, at the same time, transmits the transmission data according to the transmitting device system clock to the receiving device in the transmitting device;
   one or more transmission sync signal generation steps that generate the transmission sync signal based on the transmitting device system clock and an inter-device sync signal input from outside in the transmitting device;
   a write address generation step that generates a write address based on the timing of the source clock and transmission sync signal in the receiving device;
   a read address generation step that generates a read address based on the timing of a receiving device system clock and an inter-device sync signal which are input from outside in the receiving device; and
   a data storage step that stores the transmission data input from the transmitting device according to the write address and reads out the transmission data according to the read address in the receiving device.

9. The transmission method according to claim 8, wherein
   the frequency of the receiving device system clock is l/m (l and m are integer numbers) times the frequency of the transmitting device system clock,
   the read address generation step generates a read timing and a read address for reading data at a rate of m bits per l cycles of the receiving device system clock; and
   the data storage step reads out the store data according to the read timing and read address at a rate of m bits per l cycles of the receiving device system clock.

10. The transmission method according to claim 8, wherein
   the reception timing of inter-device sync signal is synchronized between a plurality of the receiving devices.

* * * * *

UNITED STATES PATENT AND TRADEMARK OFFICE
CERTIFICATE OF CORRECTION

PATENT NO. : 7,526,017 B2  Page 1 of 1
APPLICATION NO. : 11/708000
DATED : April 28, 2009
INVENTOR(S) : Hiroyuki Miyazaki It is certified that error appears in the above-identified patent and that said Letters Patent is hereby corrected as shown below:

Title Page, Column 1, under
"(65)     Prior Publication Data
    US 2008/0069192 A1    Mar. 20, 2008" insert
    --Related U.S. Application Data
(63) Continuation of International Application PCT/JP2004/014068, filed on Sep. 27, 2004.--

Column 1, line 5, above "TECHNICAL FIELD" please insert:

--CROSS-REFERENCE TO RELATED APPLICATIONS

This is a continuation under 35 U.S.C. § 111(a) of, and claims benefit under 35 U.S.C. § 120 of, PCT/JP/2004/014068, filed on September 27, 2004.--.

Signed and Sealed this

Twenty-third Day of February, 2010

David J. Kappos
*Director of the United States Patent and Trademark Office*